(12) United States Patent
Myers

(10) Patent No.: US 8,715,765 B2
(45) Date of Patent: May 6, 2014

(54) PROCESS OF TREATING BIOMASS

(76) Inventor: Randal Myers, Ruth, MS (US)

( * ) Notice: Subject to any disclaimer, the term of this patent is extended or adjusted under 35 U.S.C. 154(b) by 0 days.

(21) Appl. No.: 13/525,975

(22) Filed: Jun. 18, 2012

(65) Prior Publication Data

US 2013/0337131 A1 Dec. 19, 2013

(51) Int. Cl.
*A23K 1/00* (2006.01)

(52) U.S. Cl.
USPC ........... 426/623; 426/807; 426/635; 426/658; 426/454; 426/456; 426/478; 426/473; 426/636

(58) Field of Classification Search
USPC ......... 426/540, 623, 635, 658, 454, 456, 478, 426/473, 636, 807
See application file for complete search history.

(56) References Cited

U.S. PATENT DOCUMENTS

| 4,012,535 A * | 3/1977 | Fiala et al. ............... 426/658 |
| 8,187,848 B2 * | 5/2012 | Larsen et al. ............. 435/161 |
| 2011/0232173 A1 * | 9/2011 | Lefebvre ..................... 47/9 |
| 2013/0011885 A1 * | 1/2013 | Binder et al. ............. 435/115 |
| 2013/0130331 A1 * | 5/2013 | Binder et al. ............. 435/115 |
| 2013/0210101 A1 * | 8/2013 | Parekh et al. ............. 435/165 |

OTHER PUBLICATIONS

Abstract of CN 101703176 published May 2010.*
English Translation of CN 101703176 published May 2010.*

* cited by examiner

*Primary Examiner* — Anthony Weier
(74) *Attorney, Agent, or Firm* — Keaty Law Firm, LLC

(57) ABSTRACT

A process of treating biomass such as sugar cane bagasse utilizing practically all components of the biomass to produce livestock feed and fuel biomass. Raw bagasse is ensiled for 50-60 days, dried, mechanically separated from soil particles and ground together with plant-derived lignocellulosic materials, pelletized feed material, agricultural processing residues, or by-products at a ratio of 2:1. The resultant ground material is used as cattle feed, feed additives, fuel pellets and for other purposes.

20 Claims, 2 Drawing Sheets

PROCESS OF TREATING BIOMASS

BACKGROUND OF THE INVENTION

The present invention relates to a biomass treatment process and system suitable for use in the production of animal feed. More specifically, the present invention relates to a process the conversion of byproducts of sugar-processing into high-protein animal feed.

Bagasse is the byproduct of crushing sugar cane for the production of sugar. After sugar-bearing juice has been extracted from sugar cane, the resultant fiber is referred to as bagasse. Bagasse is composed of a harder outer shell of the wax bearing cellulose called the overs, the inner finer part called the pith, 40% water and about 10% dirt. All of these components together are called bagasse, and not very useful unless further processed.

Millions of tons of raw bagasse are produced annually by the sugar cane industry. It is currently used as a biofuel and in the manufacture of pulp and paper products and building materials. A portion of this byproduct is used in extracting bio-fuels, while most of it is wasted. Raw whole bagasse contains 50-60% moisture and 2% sugar; at 30% moisture raw bagasse contains 4% sugar; and at 15% moisture raw bagasse contains 8% sugar. 50% of whole bagasse is overs with 0% sugar. When the whole bagasse is separated the fines contain 16% sugar. When 10% molasses are added to bagasse it contains 24% to 25% sugar. The high cost of drying the fines and high transportation cost make these fines uneconomical to make, although they do make a high fiber and high energy food (due to the sugar content).

The present invention recognizes the value of bagasse as feedstuff for cattle since in addition to high starch and cellulose content bagasse is rich in plant protein and complex carbohydrates. Bagasse can be used as a fibrous diluent for heavy grain and molasses diets for cattle. Some of the factors preventing its more extensive use as animal feed are its very low digestibility (25-35%) and palatability.

The present invention contemplates provision of a method of processing bagasse to produce highly digestible and palatable animal feed as well as raw material suitable for creating bio fuel.

SUMMARY OF THE INVENTION

It is, therefore, an object of the present invention to provide a process of treating raw bagasse to produce animal feed and separate material suitable for bio fuel production.

It is another object of the invention to provide a bagasse processing method that utilizes beneficial portions of sugar cane byproduct to produce digestible feedstuff for animals, while allowing a large portion of the product to be separated for production of biofuel.

These and other objects of the invention are achieved through a provision of a method a process of treating biomass such as sugar cane bagasse and utilizing practically all components of the biomass to produce livestock feed and fuel biomass. Raw bagasse is ensiled for 50-60 days, dried, mechanically separated from soil particles and ground together with plant-derived lignocellulosic materials, pelletized feed material, agricultural processing residues, or by-products at a ratio of 2:1. The resultant ground material is used as cattle feed, feed additives, fuel pellets and for other purposes.

BRIEF DESCRIPTION OF THE DRAWINGS

Reference will now be made to the drawings, wherein like parts are designated by like numerals, and wherein.

DETAIL DESCRIPTION OF THE INVENTION

Figure 1:
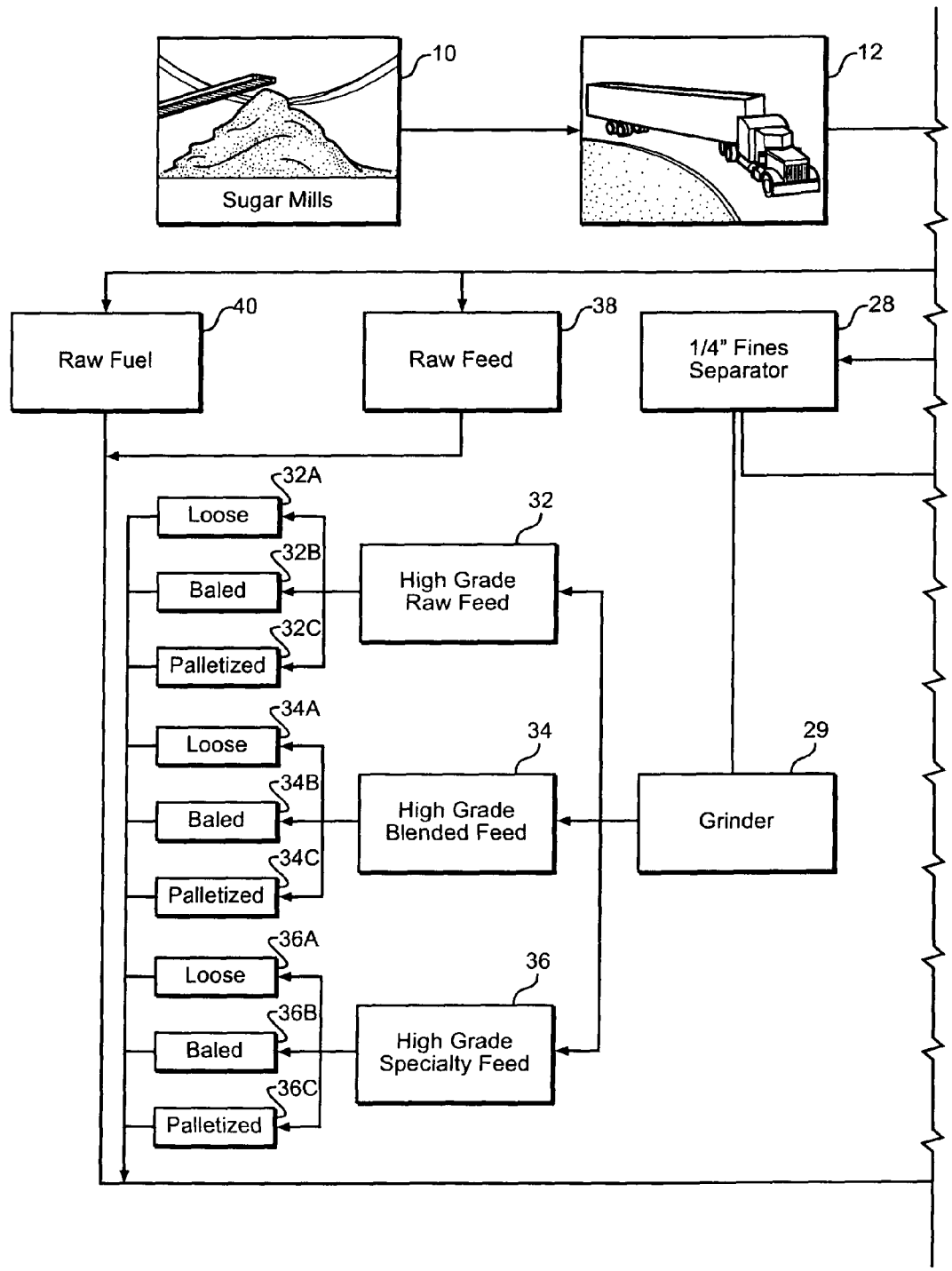
FIGS. 1 and 2, is a schematic view illustrating the method of the present invention.
Figure 2:
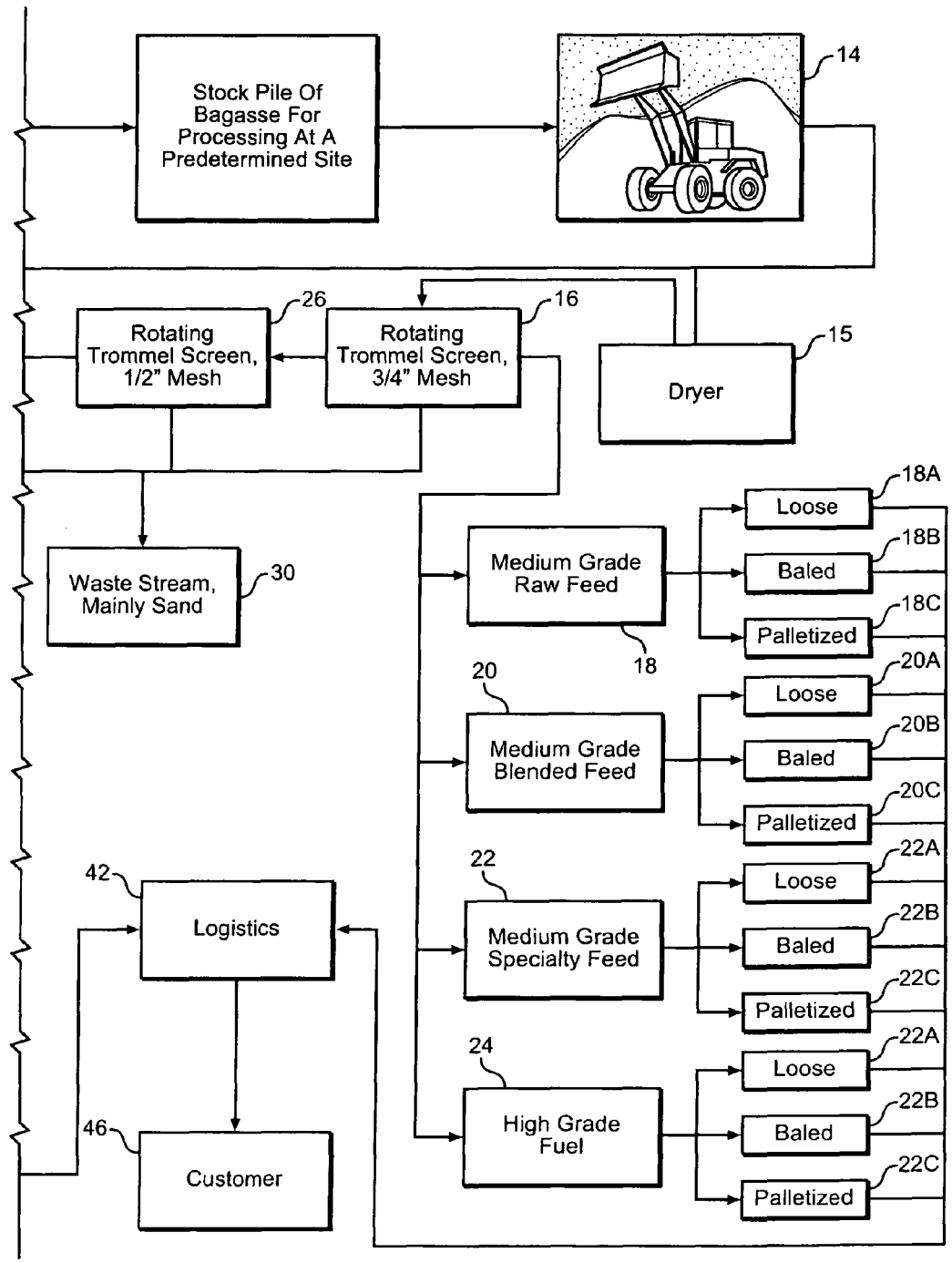

In describing the preferred embodiments of the subject matter illustrated and to be described with respect to the drawings, specific terminology will be resorted to for the sake of clarity. However, the invention is not intended to be limited to the specific terms and includes all technical equivalence which operates in a similar manner to accomplish a similar purpose.

According to the method of the present invention, all sugar cane bagasse is used for the production of useful products. Bagasse from a sugar mill 10 is transported by conventional carrier 12 to a processing site. The raw material (bagasse) is piled up with or without ensiling additives to make cane silage, which is packed down with heavy equipment, for instance a bulldozer 14. The first step is to ensile bagasse is by packing it down with moisture in large piles or by wrapping it up in round or square bales. With little or no oxygen present, bagasse ensiles. The packed raw material is left to ensile for about 8 weeks or 50-60 days.

The silage is then dried by conventional drying methods by a dryer 15 until moisture content of about 15% by weight is achieved. The dried raw material, which contains both overs and pith, is passed through a large screen having ¾" openings. The screen can be a rotating trommel screen having ¾" mesh. In this step, illustrated as step 16 in the drawing, large particles, mostly overs, are separated. The separated large particles contain about 9% sugar and about 5% protein by weight; they are 58% water by weight and about 1½" long haglike fibers. They contain very little sugar and very little dirt. The separated large particles can be used for medium grade raw feed 18, which can be sold loose as at 18a, bailed, as at 18b, or pelletized, as at 18c.

The large particles can also be used for medium grade blended feed 20 and sold loose, as at 20a, bailed as at 20b, or pelletized, as at 20c. This fraction can be blended with molasses, hay and other additives. The large particle fraction can further be used for the production of medium grade specialty feed 22, and sold loose, as at 22a, bailed as at 22b, or pelletized, as at 22c. The same fraction can be used for production of high grade fuel 24, and similarly sold loose, as at 24a, bailed as at 24b, or pelletized, as at 24c. It is envisioned that this fraction can be useful for paper production (kraft papers or cardboard), mulch, ethanol, colored mulch, animal bedding, or fuel pellets. A fuel pellet from this material is less than 1% ash by weight and can produce 8000-8700 BTUs per pound. This material does not absorb water as fast or efficiently as the fines.

The separated raw material from the trommel screen is directed through a series of successive finer screens, such as ½" mesh trommel screen 26 and then ¼" or ⅛" fine trommel screen 28. The resultant fines containing pith are induced to pass through a grinding stage, as at 29, together with additives, which can be plant-derived lignocellulosic materials, agricultural processing residues, pelletized cattle feed, or by-products. Lignocellulosic biomass can contain cellulose, hemicellulose and lignin components. In one of the preferred embodiments, the bagasse fines was mixed and ground in 2:1 proportion with corn gluten feed pellets or other selective feed pellets. The grinder can be a hammer mill capable of producing a pre-selected size particulate matter. In one of the preferred embodiments, the bagasse and the additives were ground together to particle size of about 0.25 inch.

The waste from the screening process contains sand and soil particles. The waste from the screens 16, 26, and 28 is collected in a container 30 and can be mixed in equal proportions with composted cattle manure to produce high quality fertilizer.

The screened fines are used to generate various grade cattle feed. The fines contain about 24-26% sugar and 5% protein. The fines are used to produce high grade raw feed 32, which can be sold loose, as at 32a, bailed, as at 32b, or pelletized as at 32c. The fines are also used to produce high grade blended feed, as at 34, which can be sold loose, as at 34a, bailed, as at 34b, or pelletized as at 34c. Similarly, the fines are used to produce high grade specialty feed 36, which can be sold loose, as at 36a, bailed, as at 36b, or pelletized as at 36c.

Additionally, the overs dried to 15% moisture content by weight can be blended with the fines in equal proportions. The raw material from the stored silage is used to produce raw feed 38, which when blended with the fines, has about 37.5% moisture content by weight. This moisture content is acceptable as an ensiled product feed for dairies and cattle feeders.

Ensiled bagasse can be used for production of bio fuel in step 40. Raw ensiled biomass is transported at step 42 to an energy production facility, or customer 46. The feed products are bulk shipped to large cattle operations.

The fines fraction is blended with various additives, for instance rice bran in equal proportions to form a feed supplement containing up to 10% protein by weight. The fines fraction is also mixed in equal proportions with dried distilled grain soluble (which usually contains 27% protein) to create a high-protein supplement with 15% to 16% protein content by weight. As the cost of animal feed rises, the fines fraction of this process is combined in equal proportions with commercially available feed that is highly digestible and palatable for cattle.

In one embodiment of this invention, the fines fraction is blended with hay to bring the moisture content down. The fines fraction has about 60% moisture content by weight. When blended with hay, which has about 15% moisture content by weight, the finished cattle feed has about 37.5% moisture content by weight with increased digestibility for the cattle. In this embodiment, the fines can be processed by first coarse grinding bagasse and then mixing with hay.

In one aspect of the invention, the fines fraction is mixed with flour and yeast to make bread dough suitable for human consumption. Since bagasse has naturally high sugar content the dough rises without addition of sugar. It is envisioned that this blended product can be particularly attractive for developing countries.

During tests, it was observed that commercially available bagasse generates about 53% overs, 33% fines, and 14% dirt by weight. Raw bagasse is a mixture of cellulose fibers having a length of 0.5-1.5" fibers, fine fibers (less than 0.5") and sand/soil mixture. Depending on the harvest season, the amount of dirt varies—the wetter the season the more soil particles are present in bagasse. High soil/sand content lowers the energy efficiency of any produced fuel. Raw bagasse has too much sugar to make good fuel pellets. The sugar and ash (soil, sand) lower the energy value of bagasse as the biomass for fuel production. However, when separated according to the method of this invention the overs (long-fiber fraction) has little sugar or dirt and produces high energy value fuel pellet. The fines (short fiber fraction), which contain pith, has high fiber and high sugar content. With the dirt removed the fines fraction produces high-energy/high fiber animal feed or animal feed supplement. Addition of high protein supplement produces economically priced, high quality cattle feed.

The coarse overs (fraction from screening through the screen 16) can be used in paper production, hay and mulch production. In paper production, cellulosic ethanol can be removed leaving long fibers, which are desirable in paper product manufacturing. It can also be used for producing erosion mats for erosion control of coastline. The fines fraction (generated after processing through one or more fine screens 26 and 28) can be beneficially used in cow fee and ethanol production. The waste generated from screening of bagasse can be used as a soil additive or fertilizer.

It is envisioned that trommel screens can be substituted by double-decker shaker screens. The additives can be plant-derived lignocellulosic materials, agricultural processing residues, or by-products.

The present invention provides a treatment process for the separation of a biomass composition. In doing so the present invention maximizes the features of separated fractions obtained from the biomass such as bagasse. By utilizing substantially all parts of this biomass, the present invention provides significant cost savings compared to existing systems in which distinct processes and process lines are needed to convert starch and cellulose content separately. The processed biomass encounters little damage to the ultimate glucose yield available in the form of highly digestible and highly palatable feedstock.

Many other changes and modifications can be made in the process of the present invention without departing from the spirit thereof. I, therefore, pray that my rights to the present invention be limited only by the scope of the appended claims.

I claim:

1. A process for treating a biomass, comprising the steps of:
   inducing a composition comprising biomass and soil particles to be ensiled for a pre-determined period of time;
   drying the ensiled composition to obtain a pre-determined moisture content;
   mechanically separating the dried composition into a coarse fraction and a fine fraction, while substantially removing soil particles from the composition;
   combining separated coarse and fine fractions with predetermined additives containing plant-derived lignocellulosic materials, pelletized feed material, agricultural processing residues, or by-products; and
   grinding the combined separated fractions with predetermined additives matter into pre-selected size particles.

2. The process of claim 1, further processing ground separated fractions with predetermined additives matter into loose, bailed or pelletized material.

3. The process of claim 1, wherein the separated fractions are combined with pre-selected additives at a ratio 2:1.

4. The process of claim 1, wherein the pre-determined moisture content is about 15% by weight.

5. The process of claim 1, wherein the pre-selected size particles is about 0.25 inch.

6. The process of claim 1, wherein the ground particles comprise about 37.5 percent moisture by weight and between 10 and 16 percent protein by weight.

7. The process of claim 1, wherein the ground particles comprise between 9 percent and 22 percent of sugar by weight.

8. The process of claim 1, said step of mechanically separating the dried composition comprises the steps of inducing the dried composition to pass through a plurality of screens having different size screen openings.

9. The process of claim 8, wherein said screens comprise a screen having 0.75-inch openings, 0.5-inch openings and 0.25-inch openings.

10. The process of claim 1, wherein at least a portion of the ground particles produces livestock feed.

11. The process of claim 1, wherein at least a portion of the ground particles produces fuel biomass.

12. The process of claim 1, wherein the biomass and soil particles composition is ensiled for a period of between 50 and 60 days.

13. A process for treating a biomass, comprising the steps of:
- inducing a composition comprising biomass and soil particles to be ensiled for a period of time of between 50 and 60 days;
- drying the ensiled composition to obtain a moisture content of about 15 percent by weight;
- mechanically separating the dried composition into a coarse fraction and a fine fraction, while substantially removing soil particles from the composition;
- combining, at a ratio of 2:1, separated coarse and fine fractions with predetermined additives containing plant-derived lignocellulosic materials, pelletized feed material, agricultural processing residues, or by-products at a ratio of 2:1; and
- grinding the combined separated fractions with predetermined additives matter into pre-selected size particles.

14. The process of claim 13, wherein at least a portion of the ground particles produces livestock feed.

15. The process of claim 13, wherein at least a portion of the ground particles produces fuel biomass.

16. The process of claim 13, wherein the pre-selected size particles is about 0.25 inch.

17. The process of claim 13, wherein the ground particles comprise about 37.5 percent moisture by weight and between 10 and 16 percent protein by weight.

18. The process of claim 13, wherein the ground particles comprise between 9 percent and 22 percent of sugar by weight.

19. The process of claim 13, said step of mechanically separating the dried composition comprises the steps of inducing the dried composition to pass through a plurality of screens having different size screen openings.

20. The process of claim 19, wherein said screens comprise a screen having 0.75-inch openings, 0.5-inch openings and 0.25-inch openings.

* * * * *